United States Patent
Song et al.

(10) Patent No.: US 11,529,761 B2
(45) Date of Patent: Dec. 20, 2022

(54) MICRO-CASTING AND ROLLING ADDITIVE MANUFACTURE FOR LARGE SPECIAL-SHAPED PIPES

(71) Applicant: Yanshan University, Qinhuangdao (CN)

(72) Inventors: Jianfeng Song, Qinhuangdao (CN); Yubo Wang, Qinhuangdao (CN); Dong Wang, Qinhuangdao (CN); Yinggang Shi, Qinhuangdao (CN); Xuan He, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 292 days.

(21) Appl. No.: 16/952,395

(22) Filed: Nov. 19, 2020

(65) Prior Publication Data
US 2021/0197458 A1 Jul. 1, 2021

(30) Foreign Application Priority Data
Nov. 19, 2019 (CN) .......................... 201911136586.3

(51) Int. Cl.
*B29C 64/218* (2017.01)
*B33Y 30/00* (2015.01)
(Continued)

(52) U.S. Cl.
CPC ............ *B29C 64/218* (2017.08); *B21B 13/00* (2013.01); *B21B 31/02* (2013.01); *B29C 64/236* (2017.08);
(Continued)

(58) Field of Classification Search
CPC ......... B21B 13/02; B21B 13/14; B21B 29/00; B21B 31/18; B21B 31/32; B21B 31/02;
(Continued)

(56) References Cited

U.S. PATENT DOCUMENTS 3,600,926 A * 8/1971 Hinterholzl ............. B21B 35/12
72/249
4,375,160 A * 3/1983 Verdickt ................. B21B 17/14
72/208
(Continued)

FOREIGN PATENT DOCUMENTS

CN 111069283 A * 4/2020
CN 111389907 A * 7/2020 ............... B21B 1/22
(Continued)

*Primary Examiner* — Jason L Vaughan
(74) *Attorney, Agent, or Firm* — IPro, PLLC (57) ABSTRACT

The present invention discloses a roll forming device for micro-casting and rolling additive manufacture for large special-shaped pipes, comprises a supporting assembly, a sliding assembly, and a roller system assembly. The sliding assembly includes a guide rail, hydraulic cylinders, hydraulic push rods and a guide rail sliding frame. Two ends of the guide rail are respectively fixedly connected with the centers of two ends of the frame plate in a width direction, the lower surface of the sliding plate of the guide raid sliding frame is slidably connected with the guide rail, housings of the hydraulic cylinders are respectively fixedly connected to the centers at both ends of the frame plate in the width direction. The invention adopts the structures of the guide rail, the hydraulic cylinder and the steering hinge rod to expand the working range of the device and the working types of workable parts.

9 Claims, 4 Drawing Sheets

(51) Int. Cl.
*B33Y 80/00* (2015.01)
*B29C 64/236* (2017.01)
*B21B 13/00* (2006.01)
*B21B 31/02* (2006.01)
*B29L 23/00* (2006.01)

(52) U.S. Cl.
CPC ............... *B33Y 30/00* (2014.12); *B33Y 80/00* (2014.12); *B29L 2023/22* (2013.01)

(58) Field of Classification Search
CPC ..... B21B 31/025; B21B 31/026; B21B 19/12; B21B 17/14
See application file for complete search history.

(56) References Cited

U.S. PATENT DOCUMENTS

| | | | | |
|---|---|---|---|---|
| 4,587,702 A | * | 5/1986 | Kates | ...................... B21B 27/02 |
| | | | | 72/203 |
| 6,490,900 B1 | * | 12/2002 | Oliver | ..................... B21B 17/14 |
| | | | | 72/224 |
| 2005/0028574 A1 | * | 2/2005 | Lobbecke | ............. B21B 45/004 |
| | | | | 72/202 |

FOREIGN PATENT DOCUMENTS

| | | | | |
|---|---|---|---|---|
| CN | 112845593 A | * | 5/2021 | |
| CN | 113102508 A | * | 7/2021 | |
| CN | 113560347 A | * | 10/2021 | |
| CN | 113976625 A | * | 1/2022 | |

\* cited by examiner

MICRO-CASTING AND ROLLING ADDITIVE MANUFACTURE FOR LARGE SPECIAL-SHAPED PIPES

FIELD OF THE INVENTION

The present application relates to the field for near-net forming and additive manufacture for a special-shaped steel pipe of a large connection pipe used for nuclear power, in particularly, to a roll forming device for the micro-casting and rolling additive manufacture of a large special-shaped pipe.

BACKGROUND OF THE INVENTION

The Large special-shaped connection pipes for nuclear power are mainly used in nuclear power generators. The material of the connection pipe is special, and the inner holes and the profile thereof are irregular complex, also, since the connection pipe need to withstand high temperature and high-pressure steam under the working conditions, they have extreme strict requirements on the microstructures and internal defects. Currently, the connection pipe is mainly relied on forging process to produce. The forging process has a long production process and complex procedures, which require a large-scale forging equipment and a flaw detection device, thus, the production cost of large-scale pipes remains high.

Large steel pipes with irregular shapes are usually used in the industrial production. Due to their special shapes and larger volumes, they can be manufactured by long process methods such as casting and rolling, and if the wall thickness thereof is small, they can be produced by welding. With the development of science and technology, a more advanced near-net forming manufacture method such as additive manufacture has been emerged, which can greatly shorten the manufacturing process and reduce intermediate links. At the same time, it can effectively control the internal structures and defects, and significantly reduce the product production cost. However, for the manufacture of large irregular steel pipes, a corresponding manufacture equipment is required to be designed.

The manufacturing method for the large special-shaped connection pipes for nuclear power is laser cladding, and at the same time, the auxiliary work of the pressing device is required in order to obtain a dense metal layer. In view of this situation, it is urgent to design a surface compaction forming device.

SUMMARY OF THE INVENTION

In view of the problems existing in the prior art, the present invention provides a roll forming device for micro-casting and rolling additive manufacture for large special-shaped pipes, which mainly solves the problem of being able to roll form immediately after laser cladding, reducing processing procedures and defective products rate, improving the quality of product processing, and making more kinds of processing types.

The invention provides a roll forming device for micro-casting and rolling additive manufacture for large special-shaped pipes, which comprises a supporting assembly, a sliding assembly, and a roller system assembly. The supporting assembly includes a first vertical wall, a frame plate, a second vertical wall and hexagonal head bolts, the first vertical wall and the second vertical wall are both T-shaped, and the middle portion of the frame plate has a hollow structure, a first end of the first vertical wall and a first end of the second vertical wall are respectively flatly provided on the ground, and a first end and a second end of the bottom of the frame plate are respectively fixedly connected with a second end of the first vertical wall and a second end of the second vertical wall through hexagonal head bolts, two side surfaces of the frame plate are respectively flush with a first side surface of the first vertical wall and a first side surface of the second vertical wall in a length direction, and said two side surfaces of the frame plate are respectively flush with a second side surface of the first vertical wall and a second side surface of the second vertical wall in a width direction. The sliding assembly includes a guide rail, a first hydraulic cylinder, a second hydraulic cylinder, a first hydraulic pushing rod, a second hydraulic pushing rod, cylindrical pins, and a guide rail sliding frame, two ends of said guide rail are respectively fixedly connected to centers of two ends of said frame plate in the width direction, a middle portion of the guide rail sliding frame has a hollow structure which is able to slide on the guide rail, a lower surface of the sliding plate of the guide rail sliding frame is slidably connected with the guide rail, and a housing of the first hydraulic cylinder and a housing of the second hydraulic cylinder are respectively fixedly connected to the centers at both ends of the frame plate in the width direction, and the housing of the first hydraulic cylinder and the housing of the second hydraulic cylinder are respectively located in the middle portions of the two ends of the guide rail, a first end of the first hydraulic pushing rod and a first end of the second hydraulic pushing rod are slidably connected to the first hydraulic cylinder and the second hydraulic cylinder, respectively, and a second end of the first hydraulic pushing rod and a second end of the second hydraulic pushing rod are respectively fixedly connected with a first pair of earrings the guide rail sliding frame and a second pair of earrings of the guide rail sliding frame through a cylindrical pin. The roller system assembly includes a roller cover, a first roller, a second roller, a first bearing, a second bearing, a third bearing, a fourth bearing, a first bearing end cap, a second bearing end cap, and a third bearing end cap, a fourth bearing end cap, a first steering hinge rod, a second steering hinge rod, and hexagonal head bolts, both the outer shape of the first roller and the outer shape of the second roller are stepped shafts, and the shaft sections at both ends of the first roller respectively pass through the inner diameter of the first bearing and the inner diameter of the second bearing and are connected with the inner diameter of the first bearing end cap and the inner diameter of the second bearing end cap, and the shaft sections at both ends of the second roller respectively pass through the inner diameter of the third bearing and the inner diameter of the fourth bearing and are connected with the inner diameter of the third bearing end cap and the inner diameter of the fourth bearing end cap, a roller surface of the first roller is tangent with a roller surface of the second roller, a head of the first steering hinge rod and a head of the second steering hinge rod both have a mushroom-shape, and both a tail of the first steering hinge rod and the tail of second steering hinge rod are welded with earrings provided with through holes, the head of the first steering hinge rod is connected with a first sliding groove of the guide rail sliding frame, and the head of the second steering hinge rod is connected with a second sliding groove of the guide rail sliding frame.

Compared with the prior arts, the present invention has the following advantages:

This device adopts components such as guide rails and hydraulic cylinders, which can facilitate and quickly adjust the working area of the roll forming device, and the movement is more flexible; the first and second steering hinge rods are used to enrich the working range of the roller structure and the workable parts types: by using this device, roll forming can be realized immediately after laser cladding, which improves the processing quality; the working angle can be adjusted automatically with the surface of the workpiece to be processed, also, many processing types can be realized and practical application is valuable.

MAIN REFERENCE NUMBERS

1: supporting components, 101: a first vertical wall, 102: a frame plate, 103: a second vertical wall, 104: hexagonal head bolts,
2: sliding components, 201: a guide rail, 202: a first hydraulic cylinder, 203: second hydraulic cylinder, 204: a first hydraulic pushing rod, 205: a second hydraulic pushing rod, 206: a cylindrical pin, 207: a guide rail sliding frame, 20701: a sliding plate, 20702: a first side plate, 20703: a second side plate, 20704: a first pair of earrings, 20705: a second pair of earrings 20706: a first sliding groove, 20707: a second sliding groove,
3: a roller system assembly, 301: a roller cover, 30101: a first cylindrical rod, 30102: a second cylindrical rod, 30103: a first bearing hole, 30104: a second bearing hole, 30105: a third bearing hole, 30106: a fourth bearing hole, 302: a first roller, 303: a second roller, 304: a first bearing, 305: a second bearing, 306: a third bearing, 307: a fourth bearing, 308: a first bearing end cap, 309: a second bearing end cap, 310: a third bearing end cap, 311: a fourth bearing end cap, 312: a first steering hinge rod, 313: a second steering hinge rod, and 314: hexagonal head bolts.

DETAILED DESCRIPTION OF THE EMBODIMENTS

In order to detail the technical content, structural features, achieved objectives and effects of the present invention, a detailed description will be given below in conjunction with the accompanying drawings of the specification.

Figure 1:
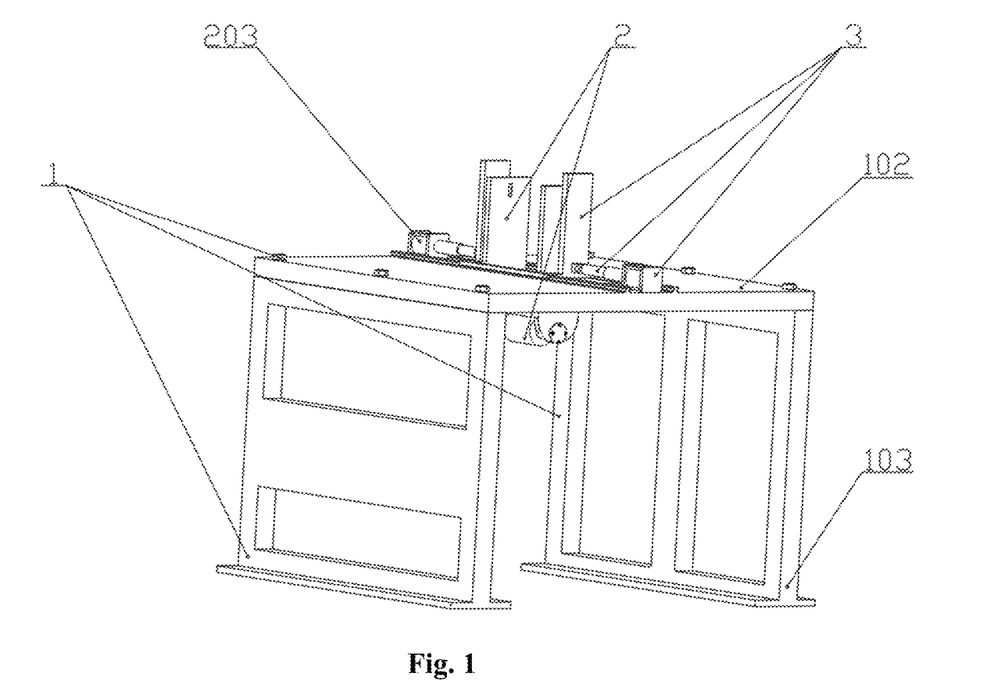
FIG. 1 is a schematic view of the overall structural components of the roll forming device for micro-casting and rolling additive manufacture for large special-shaped pipes according to the present invention.

The roll forming device for micro-casting and rolling additive manufacture for large special-shaped pipes, as shown in FIG. 1, includes a supporting assembly 1, a sliding assembly 2 and a roller system assembly 3.

Figure 2:
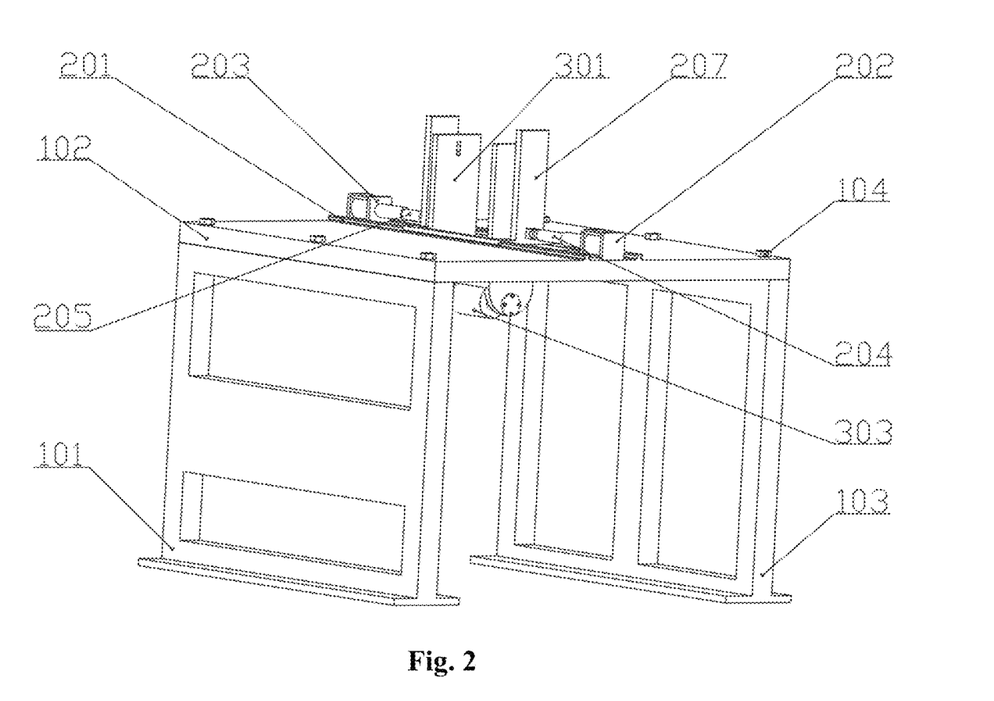
FIG. 2 is a schematic view of the overall structure of the roll forming device for micro-casting and rolling additive manufacture for large special-shaped pipes according to the present invention.

The supporting assembly 1 includes a first vertical wall 101, a frame plate 102, a second vertical wall 103 and a hexagonal head bolt 104. As shown in FIG. 2, the first vertical wall 101 and the second vertical wall 103 are both T-shaped, the middle portion of the frame plate 102 has a hollow structure, and the first end of the first vertical wall 101 and the first end of the second vertical wall 103 are flatly provided on the ground, respectively. The first end and the second end of the bottom of the frame plate 102 are fixedly connected with the second end of the first vertical wall 101 and the second end of the second vertical wall 103 through hexagonal head bolts 104, respectively. In the length direction, two side surfaces of the frame plate 102 are flush with the first side surface of the first vertical wall 101 and the first side surface of the second vertical wall 103, respectively. In the width direction, the two side surfaces of the frame plate 102 are flush with the second side surface of the first vertical wall 101 and the second side surface of the second vertical wall 103, respectively.

Figure 3:
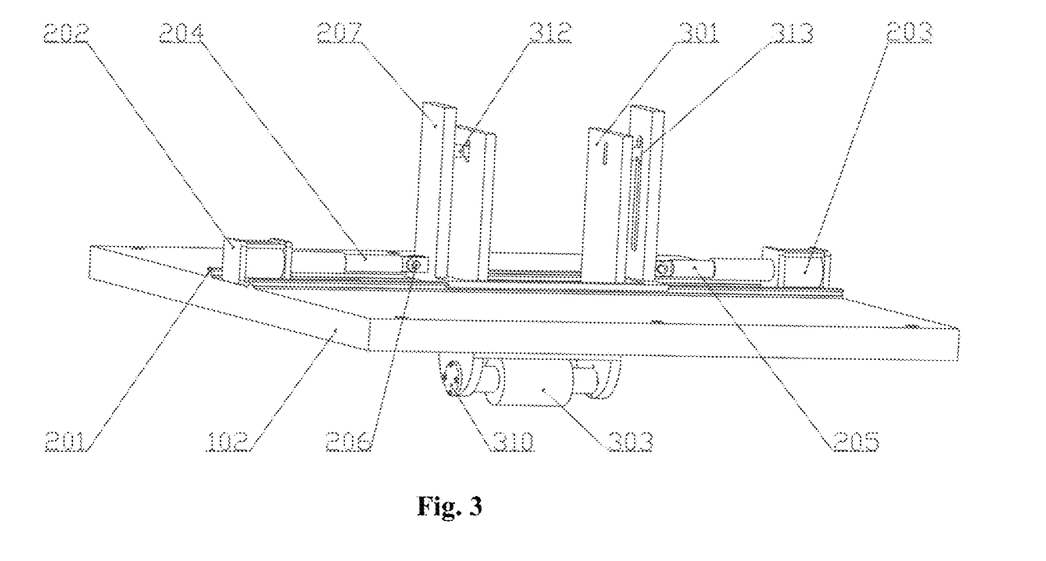
FIG. 3 is a schematic view of the overall structure of the roll forming device for micro-casting and rolling additive manufacture for large special-shaped pipes according to the present invention.

The sliding assembly 2 as shown in FIG. 3 includes a guide rail 201, a first hydraulic cylinder 202, a second hydraulic cylinder 203, a first hydraulic pushing rod 204, a second hydraulic pushing rod 205, a cylindrical pin 206 and a guide rail sliding frame 207. Two ends of the guide rail 201 are respectively fixedly connected to the centers of two ends of the frame plate 102 in a width direction. The middle portion of the guide rail sliding frame 207 has a hollow structure, which can be sliding on the guide rail 201. The lower surface of the sliding plate of the guide rail sliding frame 207 is slidably connected with the guide rail 201. The housing of the first hydraulic cylinder 202 and the housing of the second hydraulic cylinder 203 are respectively fixedly connected to the centers of the both ends of the frame plate 102 in a width direction, and the housing of the first hydraulic cylinder 202 and the housing of the second hydraulic cylinder 203 are respectively located at the middle portion of both ends of the rail 201. The first end of the first hydraulic pushing rod 204 and the first end of the second hydraulic pushing rod 205 are respectively slidably connected to the first hydraulic cylinder 202 and the second hydraulic cylinder 203, and the second end of the first hydraulic pushing rod 204 and the second end of the second hydraulic pushing rod 205 are respectively fixedly connected with the first pair of earrings 20704 and the second pair of earrings 20705 through cylindrical pins 206.

Figure 4:
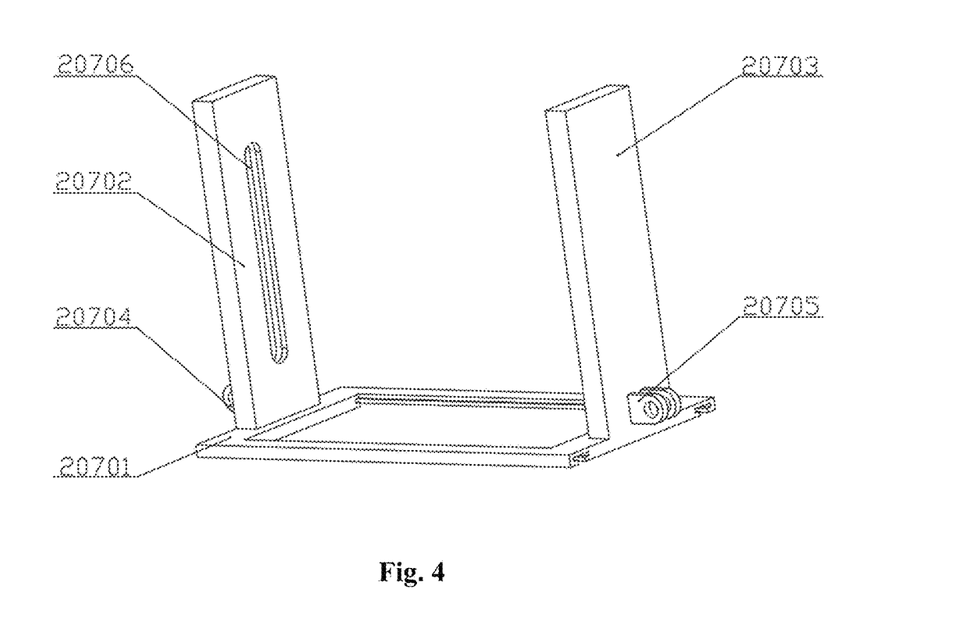
FIG. 4 is a first schematic view of the sliding assembly structure of the roll forming device for micro-casting and rolling additive manufacture for large shaped pipes according to the present invention.
Figure 5:
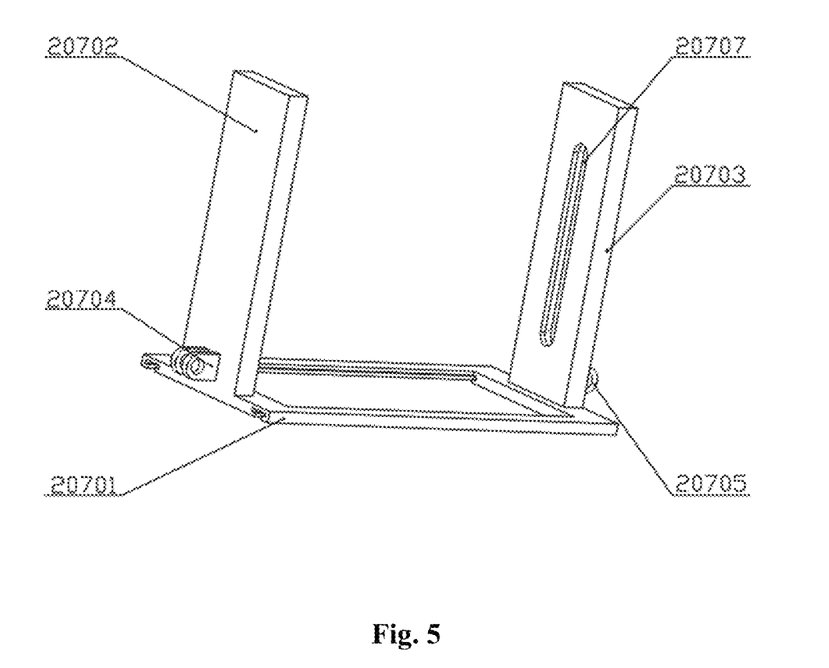
FIG. 5 is a second schematic view of the sliding assembly structure of the roll forming device for micro-casting and rolling additive manufacture for large special-shaped pipes of the present invention.

As shown in FIGS. 4 and 5, the guide rail sliding frame 207 includes a sliding plate 20701, a first side plate 20702, a second side plate 20703, a first pair of earrings 20704, a second pair of earrings 20705, a first sliding groove 20706, and a second sliding groove 20707. Two ends of the upper surface of the sliding plate 20701 are welded to the first end surface of the first side plate 20702 and the first end surface of the second side plate 20703, respectively. The inner side surface of the first side plate 20702 is provided with a first sliding groove 20706 thereon and the inner side surface of the second side plate 20703 is provided with a second chute 20707 thereon. Both the first groove 20706 and the second groove 20707 are the groove with a semicircular profile at both ends.

Figure 6:
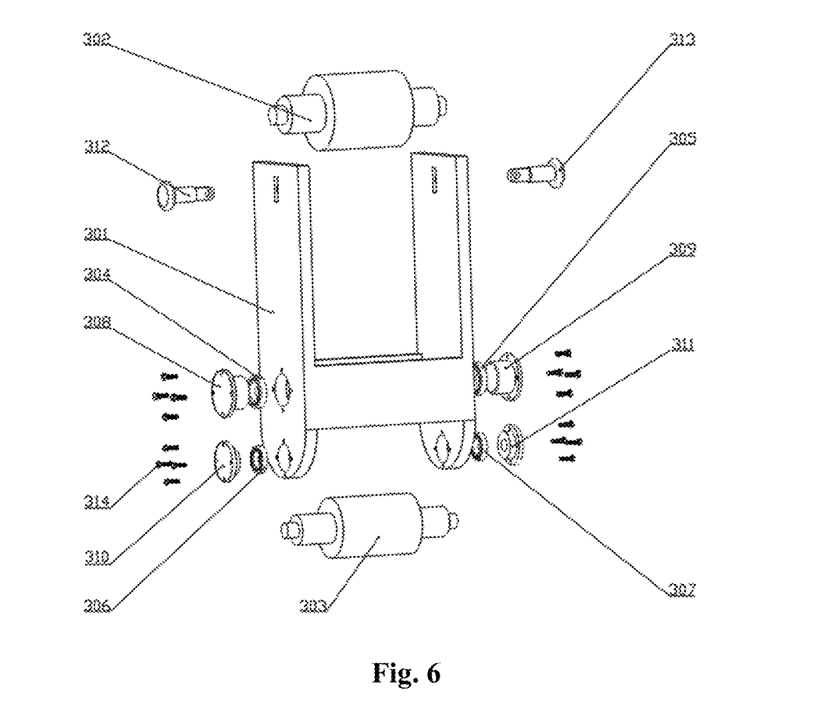
FIG. 6 is an exploded schematic view of the structure of the roller system assembly of the roll forming device for micro-casting and rolling additive manufacture for large special-shaped pipes according to the present invention.

The roller system assembly 3, as shown in FIG. 6, includes a roller cover 301, a first roller 302, a second roller 303, a first bearing 304, a second bearing 305, a third bearing 306, a fourth bearing 307, and a first bearing end cap 308, a second bearing end cap 309, a third bearing end cap 310, a fourth bearing end cap 311, a first steering hinge rod 312, a second steering hinge rod 313 and hexagonal head bolts 314.

Both the first roller 302 and the second roller 303 have stepped shafts profiles, and the shaft sections at both ends of the first roller 302 respectively pass through the inner diameter of the first bearing 304 and the inner diameter of the second bearing 305 and being connected with inner diameter of the first bearing end cap 308 and the inner diameter of the second bearing end cap 309, and the shaft sections at both ends of the second roller 303 respectively pass through the inner diameter of the third bearing 306 and the inner diameter of the fourth bearing 307, and are connected with the inner diameter of the third bearing end cap 310 and the inner diameter of the fourth bearing end cap 311. The roller surface of the first roller 302 and the roller surface of the second roller 303 are externally-tangent. Both the head of the first steering hinge rod 313 and the head of the second steering hinge rod 313 have a mushroom shape, and the tail of the first steering hinge rod 312 and the tail of the second steering hinge rod 313 are both welded with an earring. The earring is provided with a through hole. The head of the first steering hinge rod 312 is connected with the first sliding groove 20706. The head of the second steering hinge rod 313 is connected with the second sliding groove 20707.

Figure 7:
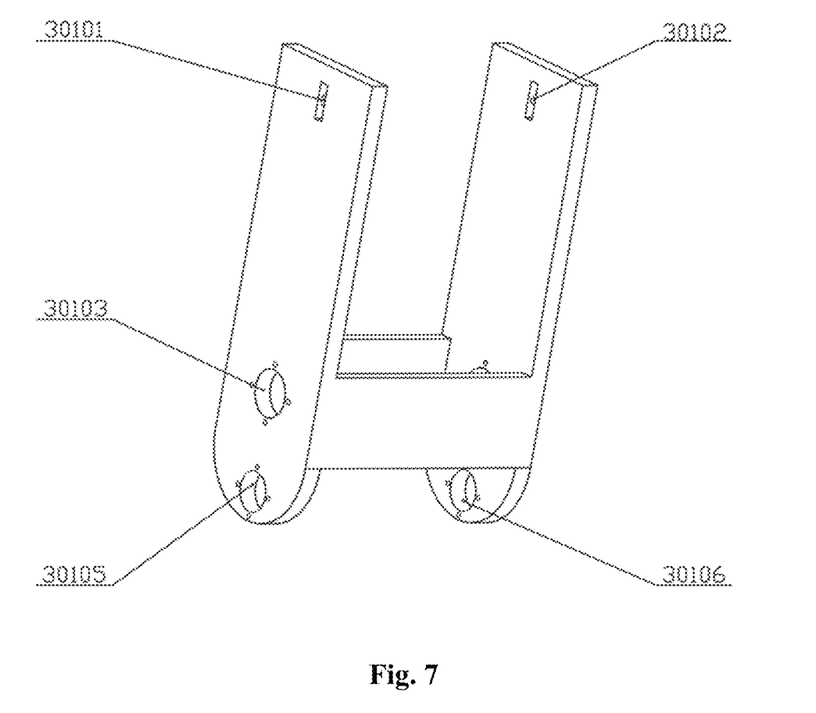
FIG. 7 is a first schematic view of the structure of the roller cover of the roll forming device for micro-casting and rolling additive manufacture for large special-shaped pipes according to the present invention.
Figure 8:
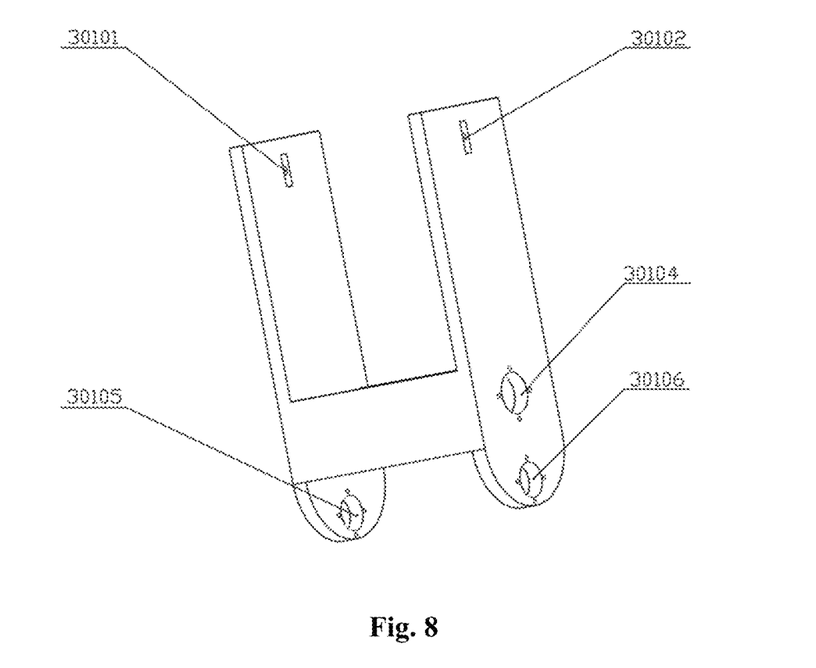
FIG. 8 is a second schematic view of the structure of the roller cover of the roll forming device for micro-casting and rolling additive manufacture for large special-shaped pipes according to the present invention.

As shown in FIGS. 7 and 8, the roller cover 301 includes a first cylindrical rod 30101, a second cylindrical rod 30102, a first bearing hole 30103, a second bearing hole 30104, a third bearing hole 30105 and a fourth bearing hole 30106. The first cylindrical rod 30101 and the second cylindrical rod 30102 are respectively located inside both sides of the upper portion of the roller cover 301. The first bearing hole 30103, the second bearing hole 30104, the third bearing hole 30105 and the fourth bearing hole 30106 are respectively located on both sides of the lower portion of the roller cover 301. The first cylindrical rod 30101 and the second cylindrical rod 30102 are connected with the earrings of the first steering hinge rod 312 and the earrings of the second steering hinge rod 313.

As shown in FIGS. 6, 7 and 8, the outer diameter of the first bearing 304 and the outer diameter of the second bearing 305 are fixedly connected with the first bearing hole 30103 and the second bearing hole 30104, respectively, and the outer diameter of the third bearing 306 and the outer diameters of the fourth bearing 307 are respectively fixedly connected with the third bearing hole 30105 and the fourth bearing hole 30106. The first bearing end cap 308 and the second bearing end cap 309 are respectively fixedly connected with one side surface of the first bearing hole 30103 and one side surface of the second bearing hole 30104 through hexagonal head bolts 314. The third bearing end cap 310 and the fourth bearing end cap 311 are respectively fixedly connected with one side surface of the third bearing hole 30105 and one side surface of the fourth bearing hole 30106 through hexagonal head bolts 314.

As shown in FIG. 3, the length of the hollow structure of the frame plate 102 is greater than a distance between the left outer side and the right outer side of the roller cover 301, and the width of the hollow structure of the frame plate 102 is greater than a distance between the front side and the rear side of the roller cover 301. As shown in FIG. 3, the length of the hollow structure of the sliding plate 20701 is less than a distance between the inner side of the side plate 20702 and the inner side of the second side plate 20703, the width of the hollow structure of the frame plate 20701 is greater than the width of the side plate, and the size of the hollow structure of the frame plate 102 is larger than the size of the hollow structure of the sliding plate 20701. As shown in FIG. 2, both the outer end surface of the first hydraulic cylinder 201 and the outer end surface of the second hydraulic cylinder 203 are flush with the frame plate 102, the length of the guide rail 201 is equal to the length of the frame plate 102, and the thickness of the first vertical wall 101 and the thickness of the second vertical wall 103 are equal to the length of the frame plate 102.

As shown in FIGS. 6, 7 and 8, the maximum outer diameter of the first roller 302 is greater than the maximum outer diameter of the second roller 303. The thickness of the earrings at the tail end of the first steering hinge rod 312 and the thickness of the earrings at the tail end of the second steering hinge rod 313 are smaller than the less one between the outer diameter of the first steering hinge rod 312 and the outer diameter of the second steering hinge rod 313. Both the distance between the first bearing hole 30103 and the lower portion of the roller cover 301 and the distance between the second bearing hole 30104 and the lower portion of the roller cover 301 are greater than the distance between the third bearing hole 30105 and the lower portion of the roller cover 301 and the distance between the fourth bearing hole 30106 and the lower portion of the roller cover 301.

As shown in FIG. 2, the first vertical wall 101 and the second vertical wall 103 are symmetrically distributed about the center of the frame plate 102. The earrings at the second end of the first hydraulic pushing rod 204 and the first pair of earrings 20704 are coaxial, and the earrings at the second end of second hydraulic pushing rod 205 and the second pair of earrings 20705 are coaxial.

As shown in FIGS. 6, 7 and 8, the outer diameter of the first cylindrical rod 30101 and the ear hole of the first steering hinge rod 312 are coaxial, and the outer diameter of the second cylindrical rod 30102 and the ear hole of the second steering hinge rod 313 are coaxial. The first roller 302, the first bearing hole 30103, the second bearing hole 30104, the first bearing end cap 308 and the second bearing end cap 309 are coaxial, the second roller 303, the third bearing hole 30105, and the fourth bearing holes 30106, the third bearing end cap 310 and the fourth bearing end cap 311 are coaxial.

The lower surface of the head of the first steering hinge rod 312 is tight to the right inner surface of the first sliding groove 20706, and there is a gap between the upper surface of the head of the first steering hinge rod 312 and the left inner surface of the first sliding groove 20706. The lower surface of the head of the second steering hinge rod 313 is tight to the inner surface of the second sliding groove 20707, and there is a gap between the upper surface of the head of the second steering hinge rod 313 and the left inner surface of the second sliding groove 20707.

The following is a further description of a roll forming device for micro-casting and rolling additive manufacture for large special-shaped pipes according to the present invention in conjunction with examples:

After laser cladding, the relevant roll forming processes are performed by the device of the present invention, and the main operation steps are as follows:

First, the sliding assembly 2 in the device starts to translate and to introduce the hydraulic oil into the first hydraulic cylinder 202, and the first hydraulic pushing rod 204 starts to extend outwardly, and at this time, the hydraulic oil in the second hydraulic cylinder 204 is flowed out so as to push the guide rail sliding frame 207 to start sliding on the guide rail 201, and then the roller system assembly 3 mounted on the guide rail sliding frame 207 follows to translate forwardly; if the hydraulic oil is introduced into the second hydraulic cylinder 203, the second hydraulic pushing rod 205 starts to extend outwardly, and at this time, the hydraulic oil in the first hydraulic cylinder 204 is flowed out so as to push the guide rail sliding frame 207 to slide in an opposite direction on the guide rail 201, and the roller system assembly 3 mounted on the guide rail sliding frame 207 follows to translate in a reverse direction, the adjustable function of the roller system assembly 3 in the working area can be realized by such function, and bidirectional work is performed.

Then, processing the workpiece after laser cladding is started, the outer diameter of the second roller 303 is tangent to the outer surface of the heterogeneous connection pipe, so that the surface of the workpiece is in a compressed state by using the gravity of the roller assembly 3;

Since the first cylindrical rod 30101 and the second cylindrical rod 30102 are connected with the earrings of the first steering hinge rod 312 and the earrings of the second steering hinge rod 313, the head of the first steering hinge rod 312 is connected to the first sliding groove 20706, and the head of the second steering hinge rod 313 is connected to the second chute 20707. At the same time, the lower surface of the head of the first steering hinge rod 312 is tight to the right inner side of the first sliding groove 20706, and there is a gap existed between the upper surface of the head of the first steering hinge rod 312 and the left inner side of the first sliding groove 20706, also, the lower surface of the head of the second steering hinge rod 313 is tight to the inner side of the second sliding groove 20707, and there is a gap existed between the upper surface of the head of the second steering hinge rod 313 and the left inner surface of the second sliding groove 20707.

Therefore, as the process is performed, the outer diameter of the connection pipe is continuously to be increased, which will cause the roller assembly 3 composed of the roller cover 301, the first roller 302, and the second roller 303 and so on to passively move upward, and the first steering hinge rod 312 slides upwardly in the first sliding groove 20706 of the guide rail sliding frame 207, and the second steering hinge rod 313 slides upwardly in the second sliding groove 20707 of the guide sliding frame 207.

The outer surface of the large special-shaped connection pipe for nuclear is power has a cone-shaped irregular surface. Because the first steering hinge rod 312 is hinged with the roller cover 301, the second steering hinge rod 313 is hinged with the roller cover 301, under the self-gravity of the roller assembly 3, the roller assembly 3 may be inclined at the same angle as the conical degree of the outer surface of the special-shaped connection pipe, and the state of the outer cylindrical surface of the second roller 303 being in contact with the outer surface of the special-shaped connection pipe is always kept. With this device, a dense surface can be formed.

The above-mentioned embodiments only describe the preferred embodiments of the present invention and do not limit the scope of the present invention. Without departing from the design spirit of the present invention, those of ordinary skills in the art have made various contributions to the technical solutions of the present invention. Such modifications and improvements shall fall within the protection scope determined by the claims of the present invention.

What is claimed is:

1. A roll forming device for micro-casting and rolling additive manufacture for large special-shaped pipes, comprises a supporting assembly, a sliding assembly, and a roller system assembly, and wherein, said supporting assembly includes a first vertical wall, a frame plate, a second vertical wall and hexagonal head bolts, the first vertical wall and the second vertical wall are both T-shaped, and the middle portion of the frame plate has a hollow structure, a first end of the first vertical wall and a first end of the second vertical wall are respectively flatly provided on the ground, and a first end and a second end of the bottom of the frame plate are respectively fixedly connected with a second end of the first vertical wall and a second end of the second vertical wall through hexagonal head bolts, two side surfaces of the frame is plate are respectively flush with a first side surface of the first vertical wall and a first side surface of the second vertical wall in a length direction, and said two side surfaces of the frame plate are respectively flush with a second side surface of the first vertical wall and a second side surface of the second vertical wall in a width direction;

said sliding assembly includes a guide rail, a first hydraulic cylinder, a second hydraulic cylinder, a first hydraulic pushing rod, a second hydraulic pushing rod, cylindrical pins, and a guide rail sliding frame, two ends of said guide rail are respectively fixedly connected to centers of two ends of said frame plate in the width direction, a middle portion of the guide rail sliding frame has a hollow structure which is able to slide on the guide rail, a lower surface of the sliding plate of the guide rail sliding frame is slidably connected with the guide rail, and a housing of the first hydraulic cylinder and a housing of the second hydraulic cylinder are respectively fixedly connected to the centers at both ends of the frame plate in the width direction, and the housing of the first hydraulic cylinder and the housing of the second hydraulic cylinder are respectively located in the middle portions of the two ends of the guide rail, a first end of the first hydraulic pushing rod and a first end of the second hydraulic pushing rod are slidably connected to the first hydraulic cylinder and the second hydraulic cylinder, respectively, and a second end of the first hydraulic pushing rod and a second end of the second is hydraulic pushing rod are respectively fixedly connected with a first pair of earrings the guide rail sliding frame and a second pair of earrings of the guide rail sliding frame through a cylindrical pin; and said roller system assembly includes a roller cover, a first roller, a second roller, a first bearing, a second bearing, a third bearing, a fourth bearing, a first bearing end cap, a second bearing end cap, and a third bearing end cap, a fourth bearing end cap, a first steering hinge rod, a second steering hinge rod, and hexagonal head bolts, both the outer shape of the first roller and the outer shape of the second roller are stepped shafts, and the shaft sections at both ends of the first roller respectively pass through the inner diameter of the first bearing and the inner diameter of the second bearing and are connected with the inner diameter of the first bearing end cap and the inner diameter of the second bearing end cap, and the shaft sections at both ends of the second roller respectively pass through the inner diameter of the third bearing and the inner diameter of the fourth bearing and are connected with the inner diameter of the third bearing end cap and the inner diameter of the fourth bearing end cap, a roller surface of the first roller is tangent with a roller surface of the second roller, a head of the first steering hinge rod and a head of the second steering hinge rod both have a mushroom-shape, and both a tail of the first steering hinge rod and the tail of second steering hinge rod are welded with earrings provided with through holes, the head of the first is steering hinge rod is connected with a first sliding groove of the guide rail sliding frame, and the head of the second steering hinge rod is connected with a second sliding groove of the guide rail sliding frame.

2. The roll forming device for micro-casting and rolling additive manufacture for large special-shaped pipes according to claim 1, wherein,
in said sliding assembly, the guide rail sliding frame includes the sliding plate, the first side plate, the second side plate, the first pair of earrings, the second pair of earrings, the first sliding groove and the second sliding groove,
two ends of the upper surface of the slide plate are respectively welded with a first end surface of the first side plate and a first end surface of the second side plate,
an inner side surface of the first side plate and an inner side surface of the second side plate are respectively provided with the first sliding groove and the second sliding groove, the first sliding groove and the second sliding groove are the sliding grooves having semicircular profiles at both ends.

3. The roll forming device for micro-casting and rolling additive manufacture for large special-shaped pipes according to claim 1, wherein,
in said roller system assembly, the roller cover includes a first cylindrical rod and a second cylindrical rod, a first bearing hole, a second bearing hole, a third bearing hole and a fourth bearing hole, the first cylindrical rod and the second cylindrical rod are respectively located inside both sides of the upper portion of the roller cover,
the first bearing hole, the second bearing hole, the third bearing hole and the fourth bearing hole are respectively located on both sides of the lower portion of the roller cover,
the first cylindrical rod and the second cylindrical rod are connected with the earrings of the first steering hinge rod is connected and the earrings of the second steering hinge rod.

4. The roll forming device for micro-casting and rolling additive manufacture for large shaped pipes according to claim 3, wherein in the roller system assembly,
the outer diameter of the first bearing and the outer diameter of the second bearing are respectively fixedly connected with the first bearing hole and the second bearing hole,
the outer diameter of the third bearing and the outer diameter of the fourth bearing are respectively connected with the third bearing hole and the fourth bearing hole,
the first bearing end cap and the second bearing end cap are respectively fixedly connected with a side surface of the first bearing hole and a side surface of the second bearing hole through hexagonal head bolts, and
the third bearing end cap and the fourth bearing end cap are is respectively fixedly connected with a side surface of the third bearing hole and a side surface of the fourth bearing hole through hexagonal head bolts.

5. The roll forming device for micro-casting and rolling additive manufacture for large special-shaped pipes according to claim 3, wherein
the maximum outer diameter of the first roller is greater than the maximum outer diameter of the second roller,
the thickness of the earrings at the tail end of the first steering hinge rod and the earrings at the tail end of the second steering hinge rod are smaller than the diameter of the smaller outer diameter of the first steering hinge rod and the second steering hinge rod, and
a distance between the first bearing hole and the lower portion of the roller cover and a distance between the second bearing hole and the lower portion of the roller cover are greater than a distance between the third bearing hole and the lower portion of the roller cover and a distance between the fourth bearing hole and the lower portion of the roller cover.

6. The roll forming device for micro-casting and rolling additive manufacture for large special-shaped pipes according to claim 5, wherein
the outer diameter of the first cylindrical rod and an ear hole of the first steering hinge rod are coaxial, the outer diameter of the second cylindrical rod and an ear hole of the second steering hinge rod are coaxial,
the first roller, the first bearing hole, the second bearing hole, the first bearing end cap and the second bearing end cap are coaxial, and
the second roller, the third bearing hole, the fourth bearing hole, the third bearing end cap and the fourth bearing end cap are coaxial.

7. The roll forming device for micro-casting and rolling additive manufacture for large special-shaped pipes according to claim 1, wherein
the length of the hollow structure of the frame is greater than a distance between the left outer side and right outer side of the roller cover,
the width of the hollow structure of the frame plate is greater than a distance between the front side and the rear side of the roller cover,
the length of the hollowed portion of the sliding plate is smaller than a distance between the inner sides of the first side plate and the second side plate,
the width of the hollowed portion of the frame plate is greater than the width of the side plate,
the size of the hollowed portion of the frame plate is larger than the size of the hollowed portion of the sliding plate,
the outer end surface of the first hydraulic cylinder and the outer end surface of the second hydraulic cylinder are flush with the frame plate,
the length of the guide rail is equal to the length of the frame plate, and
is the thickness of the first vertical wall and the thickness of the second vertical wall are equal to the length of the frame plate.

8. The roll forming device for micro-casting and rolling additive manufacture for large special-shaped pipes according to claim 1, wherein the first vertical wall and the second vertical wall are symmetrically distributed with respect to the center of the frame plate, an earring at the second end of the hydraulic pushing rod is coaxial with the first pair of earrings, and an earning at the second end of the second hydraulic pushing rod is coaxial with the second pair of earrings.

9. The roll forming device for micro-casting and rolling additive manufacture for large special-shaped pipes according to claim 1, wherein, the lower surface of the head of the first steering hinge rod abuts against the right inner side surface of the first sliding groove, and a gap is existed between the upper surface of the head of the first steering hinge rod and the left inner side surface of the first sliding groove, and the lower surface of the head of the second steering hinge rod abuts against the inner side surface of the second sliding groove, and there is a gap between the upper surface of the second steering hinge rod head and the left inner side surface of the second sliding groove.

* * * * *